Aug. 17, 1937.   W. J. STAFFORD   2,090,313
AMUSEMENT APPARATUS
Filed Sept. 12, 1935   3 Sheets-Sheet 1

WILLIAM J. STAFFORD.
INVENTOR.

BY *Ely & Pattison*
ATTORNEYS.

Aug. 17, 1937.  W. J. STAFFORD  2,090,313
AMUSEMENT APPARATUS
Filed Sept. 12, 1935  3 Sheets-Sheet 2

WILLIAM J. STAFFORD.
INVENTOR.

WITNESS:

BY Ely & Pattison
ATTORNEYS

Aug. 17, 1937.   W. J. STAFFORD   2,090,313
AMUSEMENT APPARATUS
Filed Sept. 12, 1935   3 Sheets-Sheet 3

WILLIAM J. STAFFORD.
INVENTOR.

BY *Ely & Pattison*
ATTORNEYS.

WITNESS:

Patented Aug. 17, 1937

2,090,313

UNITED STATES PATENT OFFICE 2,090,313

AMUSEMENT APPARATUS

William J. Stafford, New York, N. Y.

Application September 12, 1935, Serial No. 40,213

6 Claims. (Cl. 273—86)

This invention relates to improvements in amusement apparatus and more particularly to that type of apparatus set forth in my prior Patent No. 1,479,753, granted January 1, 1924.

One of the main features of the invention resides in an amusement apparatus in the form of a race track wherein miniature inanimate horses may be propelled around the track in a realistic manner, thus affording the spectators an exciting and interesting amusement.

Another feature of the invention is to provide a race horse amusement apparatus wherein a like simultaneous intermittent propelling force is imparted to all the entries but due to the characteristics of the identical miniature horses when placed in motion, one horse may assume a position ahead of another during part of the race, and later fall behind, thus rendering it uncertain at the start of the race as to which horse will be the winner thereof.

A further object of the invention is the provision of a race horse amusement apparatus in which the inanimate horses freely travel in individual parallel runways from a starting barrier to a finish position, whereby they may be manually lifted from their finishing position to their starting position after completion of a race, and if desired, the relative position of the horses may be changed at the start of another race, although there is no advantage in placing the horses in what may appear an advantageous position.

A further feature of the invention is to provide an amusement apparatus of the above character in which the flat top of a rectangular box like casing is utilized as the race track and all operating mechanism is concealed from view within the casing and protected from unauthorized tampering.

With these and other objects in view, the invention resides in the certain novel construction and combination and arrangement of parts, the essential features of which are hereinafter fully described, are particularly pointed out in the appended claims, and are illustrated in the accompanying drawings, in which:

Figure 1:
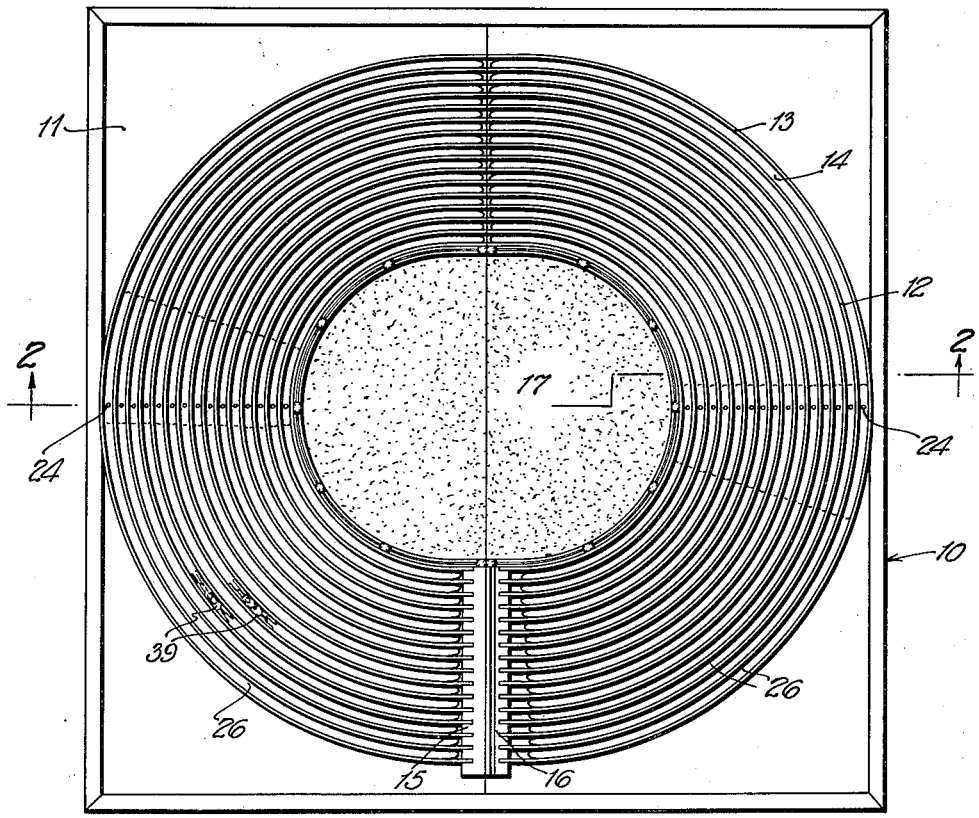
Figure 1 is a top plan view of my improved amusement apparatus.
Figure 2:
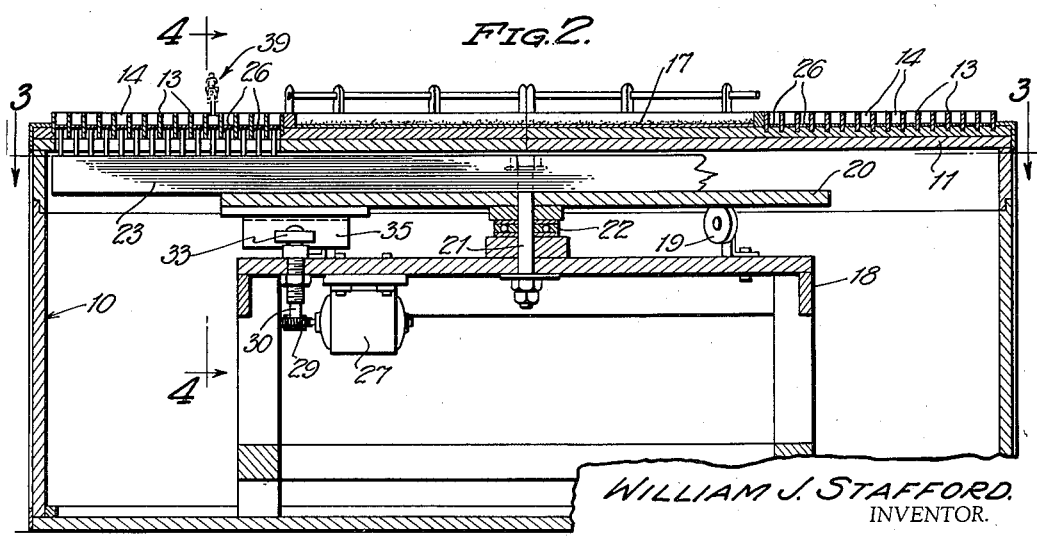
Figure 2 is a vertical transverse sectional view therethrough on the line 2—2 of Figure 1.
Figure 3:
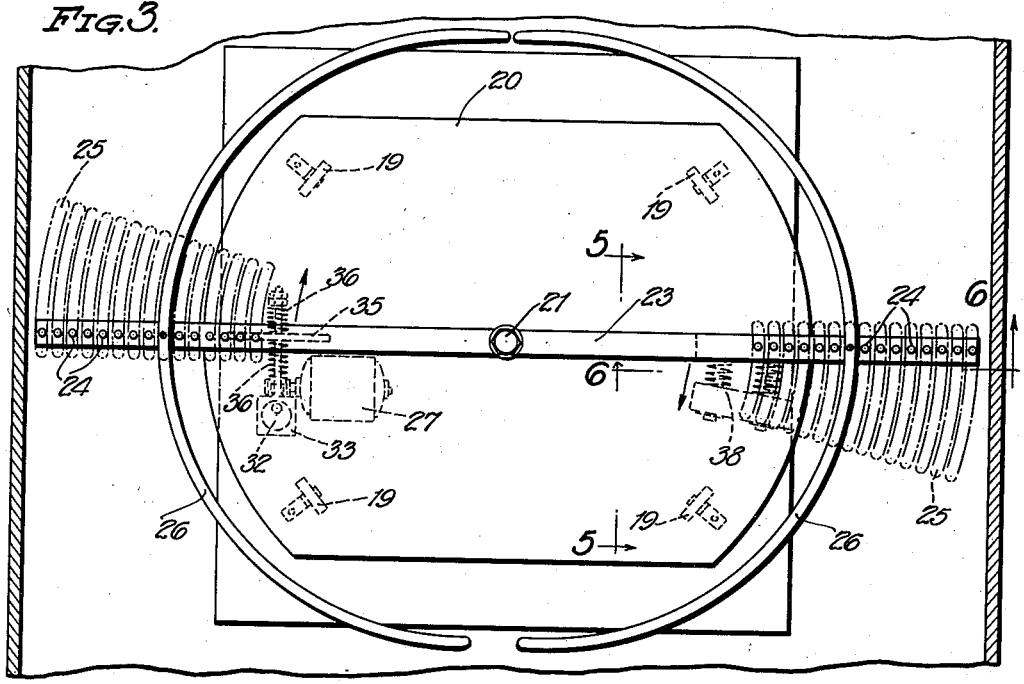
Figure 3 is a fragmentary horizontal sectional view on the line 3—3 of Figure 2.
Figure 4:
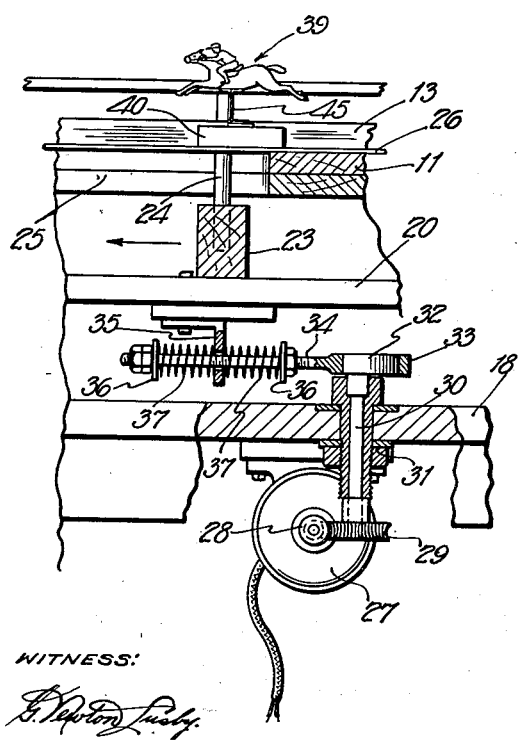
Figure 4 is an enlarged detail vertical sectional view on the line 4—4 of Figure 2.
Figure 5:
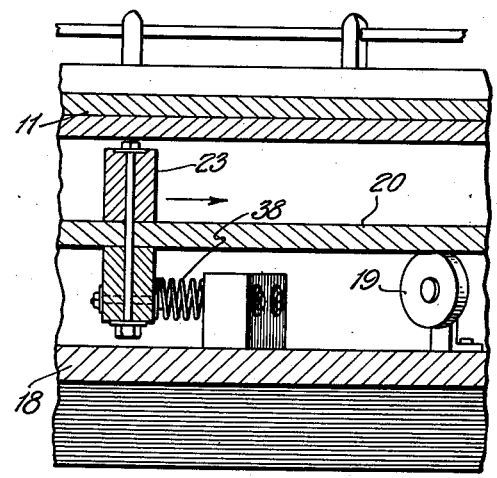
Figure 5 is an enlarged detail vertical sectional view on the line 5—5 of Figure 3.
Figure 6:
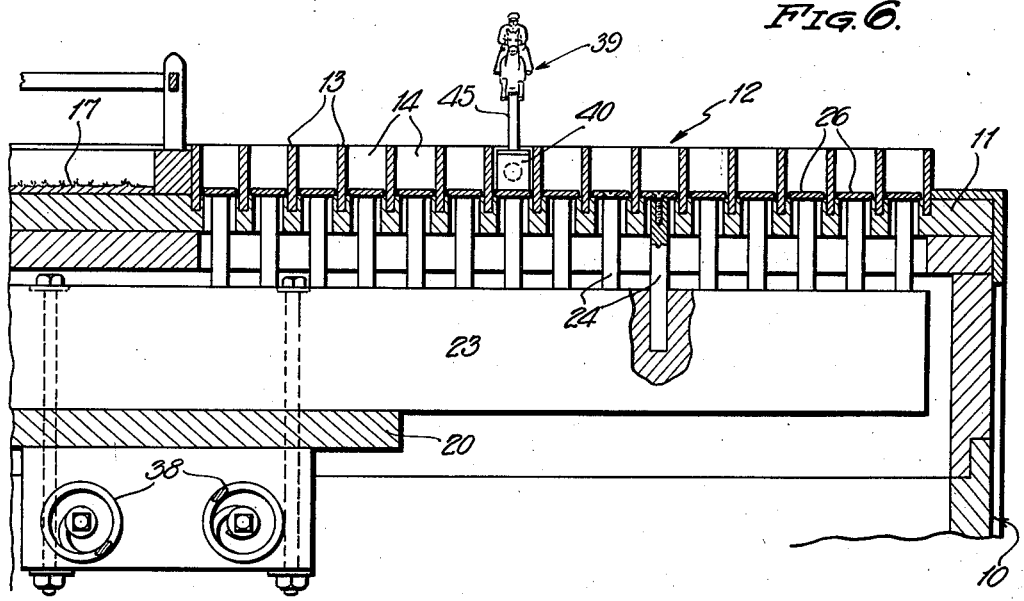
Figure 6 is an enlarged vertical sectional view on the line 6—6 of Figure 3.
Figure 7:
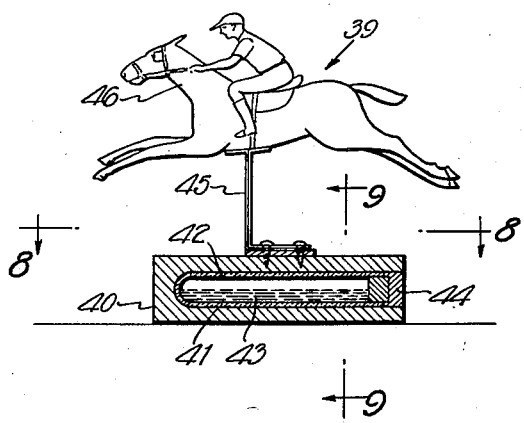
Figure 7 is a vertical sectional view through one of the race horses.
Figure 8:
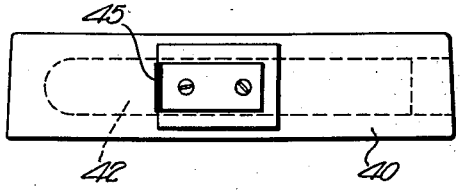
Figure 8 is a horizontal sectional view on the line 8—8 of Figure 7.
Figure 9:
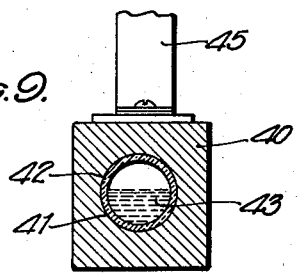
Figure 9 is a vertical transverse sectional view on the line 9—9 of Figure 7.

Referring to the drawings by reference characters, the numeral 10 designates a rectangular box-like casing which includes a flat top 11. The casing 10 may be constructed of separable sections to facilitate the knocking down of the same for shipping purposes and may contain a removable panel to facilitate access to the interior of the casing in order to reach certain working parts of the apparatus which will be hereinafter described.

The flat top 11 supports a circular or slightly elliptical shaped race track 12 which is formed by equidistantly spaced parallel guide walls 13, the space between the walls constituting run ways 14. The run ways terminate at a starting point or barrier 15 and at a finishing point or barrier 16. The starting and finishing positions 15 and 16 are disposed adjacent each other as best seen in Figure 1 of the drawings. The area 17 bounded by the race track 12 simulates the paddock of an outdoor race track in order to impart a realistic appearance to the device.

Housed within the box like casing 10 is a supporting structure 18, the top of which is in spaced relation to the top wall 11 of the casing and parallel thereto. Rollers 19 supported in an elevated position upon the top of the supporting structure 18 support a turn table 20, the axis of which is designated 21 and in the form of a bolt passing downwardly through the turn table and through the top of the supporting structure 18, there being a roller bearing 22 interposed between the turn table and the supporting structure. Supported by the top of the turn table 20 and extending beyond opposite sides of the same is a cross arm 23, the same passing through the axis of the turn table and held in position by the bolt 21 and by any other fastening means which will cause the cross arm to turn with the turn table 20. Rising upwardly from the cross arm 23 at opposite ends thereof are pins 24 which enter arcuate shaped slots 25 in the top wall 11 of the casing. The number of pins constituting each group adjacent the ends of the cross arm depends upon the number of runways 14, for there is one pin in each group for each run way and the arcuate slots 25 are disposed within the respective run ways as illustrated in dotted lines in Figure 1 of the drawings.

Disposed within the bottoms of the runways 14 and freely slidable therein, are arcuate shaped impeller members 26, there being two groups of the members 26, one group being connected to the pins 24 at one end of the cross arm 23 whereas the other group or set are connected to the pins 24 at the other end of the cross arm. The ends of the impeller members of each set terminate adjacent each other but sufficient space is left therebetween to enable an oscillatory movement to be imparted to the sets of impeller members to actuate the race elements to be hereinafter described. The impeller members 26 are relatively thin and are flat and the two groups substantially fill the length of the runways.

For the purpose of imparting oscillatory movement to the turn table 20 and cross arm 23, there is provided an electric motor 27 supported by the structure 18 and the driven armature shaft of the motor is provided with a worm 28 which is in constant mesh with a gear 29 carried by the lower end of a vertically disposed shaft 30 journaled in the bearing 31 in the top of the supporting structure 18. The top end of the shaft 30 is provided with an eccentric 32, the periphery of which is enclosed by an eccentric band 33 from which a rod 34 extends and which rod is disposed in a horizontal position. Freely slidable upon the rod 34 is a depending bracket 35 fixedly carried by the under side of the turn table 20. Adjustable stops 36 are carried by the rod 34 and are disposed in spaced relation while interposed between opposite sides of the bracket 35 and the stops 36, are equalizing springs 37. The springs 37 tend to normally hold the turn table in a position relative to the eccentric 32 but provide a resilient connection between the turn table and the eccentric to permit relative movement of the turn table with respect to the eccentric for the purpose of moving the turn table and cross arm more rapidly in one direction than the other during oscillation.

By reason of the eccentric driving means just described, it will be apparent that an oscillatory movement will be imparted to the turn table and cross arm 23, which in turn will impart a similar oscillatory movement to the two sets of impeller members 26. It is the desire to move the impeller members at a relatively slow rate of speed in a forward propelling direction and to rapidly move the same in a return or reverse direction. For this purpose, there is provided a spring bumper 38 carried by the supporting structure 18 and disposed in the path of the return movement of the cross arm 23. During movement of the cross arm in a forward direction, the springs of the spring bumper 38 will be compressed as will one of the springs 37 forming part of the flexible connection whereas the eccentric moves to the position to return the cross arm 23, the tension built up by the springs 38 and one of the springs 37 will rapidly move the cross arm relative to the position of the eccentric.

Placed in each of the runways 14 at the starting barrier preparatory to the running of a race is a racing element 39 in the form of a race horse having a rider mounted thereon. The race element 39 includes a rectangular shaped base 40, the sides of which may be slightly curved to conform to the curvature of the runway so as to permit free movement of the racing element therein. Formed within the base 40 and opening through one end thereof is a recess 41 which snugly receives a tube 42 containing a supply of mercury 43. The open end of the tube 41 is closed by a stopper 44 which frictionally engages the walls of the recess to retain the tube within the base. This tube 41 is not entirely filled with mercury but the amount of mercury contained in each of the race elements is identical and sufficient space is left to enable shifting of the mercury back and forth. Fixed to the top of the base 40 and rising upwardly therefrom is a flat spring 45, the top of which carries a miniature horse 43.

As above stated, a racing element 39 is placed in each of the runways 14 during the starting of a race, and the respective runways may be numbered for identification purposes. It is not necessary to number the racing elements for they may be interchanged with respect to the runways should it be suspected that one of the racing elements may have an advantage over the other. After placing of the racing elements in a starting position, the motor 27 is turned on and an oscillatory movement will be imparted to the cross arm 23, which in turn imparts a similar action to the impeller members 26. During the forward propelling movement of the impeller members, the racing elements are carried forward but due to the quick return movement above described, the impeller members will move relative to the racing elements, thus preventing any tendency of the racing elements to move rearwardly. By reason of the impulse imparted to the racing elements and due to the peculiar characteristics of the mercury 43 together with the vibratory movement of the horses 46 on the springs 45, the racing elements are given an added force providing they are operating in timed relation with respect to the forward impulses imparted thereto. It will be appreciated that if the vibratory movement of the horses 46 and the agitation of the mercury 43 is out of timed relation with respect to the impulses imparted by the impellers 46, that the racing elements will lag behind but may at a later stage of the race again operate in timed accord. It is the characteristic of the mercury 43 and the vibratory movement of the horse 46 that causes a variation in the speed imparted to the several racing elements 39 which may be entered in the race. It is also these characteristics which lends to the amusement apparatus an uncertainty as to the probable winner of the race and makes the same exciting for any spectators. During the forward propelling of the racing element around the runway, the sides of the base 40 freely abut the adjacent side walls of the run way and it is this slight lateral movement which also assists in disturbing the agitated condition of the mercury 43 in the racing element. It will of course be understood that the first horse reaching the finishing barrier 16 is termed the winner, and if desired, any well known form of registering or signalling apparatus may be employed for visibly indicating the winner of the race.

Although I have shown and described a circular or oval form of track, it will be understood that various other shapes may be embodied and that instead of the miniature of a horse used in connection with the racing element the racing element may be in the form of ships, automobiles or the like.

Having thus described the invention, what I claim as new and desire to secure by Letters Patent of the United States, is:—

1. An amusement apparatus comprising a box-like casing, a race course provided on the top of said casing including a plurality of parallel runways, oscillatory impelling members in the respective runways, racing elements freely supported by said impelling members, a supporting structure enclosed within said casing, a horizontally disposed arm pivotally supported by said supporting structure and underlying the runways, pins rising upwardly from said arm and respectively connected to said impelling members, a motor supported by said supporting structure, and eccentric driving means operatively connecting said motor with said arm to impart oscillatory movement thereto.

2. An amusement apparatus comprising a box-like casing, a race course provided on the top of said casing including a plurality of parallel runways, oscillatory impelling members in the respective runways, racing elements freely supported by said impelling members, a supporting structure enclosed within said casing, a horizontally disposed arm pivotally supported by said supporting structure and underlying the runways, pins rising upwardly from said arm and respectively connected to said impelling members, a motor supported by said supporting structure, eccentric driving means operatively connecting said motor with said arm to impart oscillatory movement thereto, a resilient bumper in the path of movement of said arm in one direction, and a resilient coupling included in said eccentric driving means to enable the resilient bumper to actuate said arm relative to said eccentric driving means to move said arm more rapidly in one direction than the other during oscillatory movement thereof.

3. An amusement apparatus comprising a box-like casing, a race course provided on the top of said casing including a plurality of circular runways, sets of opposed impelling members disposed within said circular runways, the ends of the sets of impelling members terminating in close proximity to each other, race elements in the respective runways and freely supported upon said impelling members, a platform housed within said casing, a horizontally disposed turn table mounted upon said platform, a cross arm fixed to the top of said turn table and extending beneath said runways, pins rising upwardly from said cross arm and connected to the respective sets of opposed impelling members, an eccentric mechanism driven by said motor, a resilient coupling between said eccentric mechanism and said cross arm, and a spring bumper mounted on said platform and engageable by said cross arm during movement of the same in one direction, substantially as and for the purpose specified.

4. An amusement apparatus comprising a supporting structure having a flat top, a race course provided on said flat top including a plurality of parallel runways, oscillatory impelling members in the respective runways, racing elements freely supported by said impelling members, a horizontally disposed arm pivotally supported by said supporting structure and disposed beneath said flat top and underlying the runways, means connecting the impelling members to said arm, a motor, and an eccentric driving means operatively connecting said motor with said arm to impart oscillatory movement thereto.

5. An amusement apparatus comprising a supporting structure having a flat top, a race course provided on said flat top including a plurality of parallel runways, oscillatory impelling members in the respective runways, racing elements freely supported by said impelling members, a horizontally disposed arm pivotally supported by said supporting structure and disposed beneath said flat top and underlying the runways, means connecting the impelling members to said arm, a motor, and eccentric driving means operatively connecting said motor with said arm to impart oscillatory movement thereto, and means acting upon said arm to move the same more rapidly in one direction than in the other direction independently of said eccentric driving means.

6. An amusement apparatus comprising a supporting structure having a flat top, a race course provided on said flat top including a plurality of circular runways, sets of opposed impelling members disposed within said circular runways and conforming substantially to the curvature thereof, the ends of the sets of impelling members terminating in close proximity to each other, race elements in the respective runways and freely supported upon said impelling members, a horizontal cross arm pivotally supported by said supporting structure and disposed beneath said flat top, means operatively connecting the ends of said cross arm to the respective sets of impelling members, a motor, and means operatively connecting said motor to said cross arm for imparting oscillatory movement thereto.

WILLIAM J. STAFFORD.